April 12, 1938.  J. C. WYNKOOP  2,114,066

CHANGEABLE ORIFICE VALVE

Filed June 8, 1937

Inventor,
J. C. Wynkoop;
By
F. E. Maynard,
his Atty

Patented Apr. 12, 1938

2,114,066

UNITED STATES PATENT OFFICE 2,114,066

CHANGEABLE ORIFICE VALVE

Jesse C. Wynkoop, Long Beach, Calif.

Application June 8, 1937, Serial No. 147,044

13 Claims. (Cl. 251—102)

This invention is a rotary core, changeable orifice valve.

For the purpose of metering flow or pressure in given fluid conduits it is desirable to have a valve including an orifice element to control the volume of flow through the valve. Such valves have been produced including an orifice element adapted to be changed while the valve is in place in the line but its flow closed off; the change being made with considerable difficulty and time-consuming labor.

Therefore, an object of this invention is to provide an orifice valve of such construction and combination and arrangement of parts that the orifice element may be very easily and quickly changed for variation of size of the orifice.

A further object is to provide for the ready and effective closing off of the valve passage prior to removal of the orifice element.

Additionally, an object is to provide an orifice valve including a shell having an inflow port and a window and to provide for the concurrent closing of the port and arrangement at the window of the orifice element in a single, short motion of the valve core.

Also, an object is to provide an orifice valve in which there is a core turnable in the chamber of the shell without body friction and carrying a constantly seated shut off gate and the freely removable orifice element.

The invention consists of certain advancements in this art as set forth in the ensuing disclosure and having, with the above, additional objects and advantages as hereinafter developed, and whose construction, combination and details of means and the manner of operation will be made manifest in the description of the embodiment shown in the annexed drawing; it being understood that modifications, variations and adaptations may be resorted to within the scope, principle and spirit of the subjoined claims.

Figure 1:
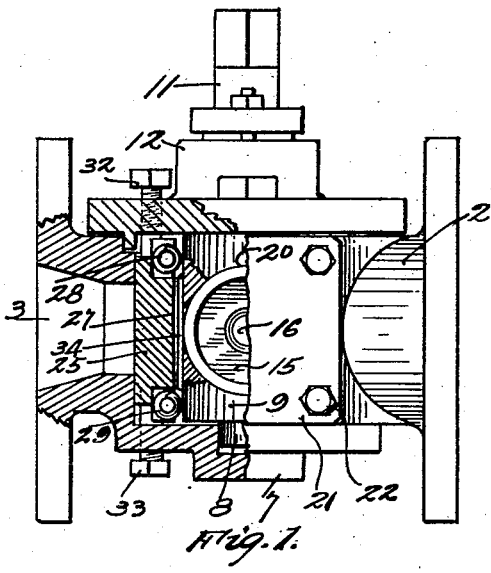
Figure 1 is a sectional side elevation of the valve with parts in closed position.

The shell 2 of the valve has an inlet port 3 to a chamber 4 and an outlet port 5 opposite port 3.

A feature of the invention is the provision of a suitable window 6 in a side of the shell, here disposed medially between the ports 3 and 5; that is in a quarter turn position as to the bore or chamber 4.

The bottom of the valve is closed by a step bearing 7 receiving the lower trunnion 8 of a flat-sided core body 9 disposed on a vertical axis in the shell intersecting the axis of the ports 3—5, and having a through flow passageway 10 to be alined with the ports in open-valve position. The core 9 has a top stem 11 passing through and turning in a bonnet 12 sealing the valve chamber 4.

The flow capacity of the valve is determined by an orifice device here in the form of a discoidal element 15 having a given size concentric orifice 16 of conical wall surface 17. In the form here shown the element 15 has an outside flange 18 and an inwardly directed flange 19. The element 15 is disposed in a seat 20 provided therefor in the side face of the rotary core 9 which lies toward the outlet port of the valve when the core is in opening position in the shell 2; the outermost face of the flange 19 is curved to concentrically conform to and ride on the complementary surface of the shell chamber 4.

It is understood that a set of the orifice elements 15 with several sizes of flow orifices 16 will be provided for selection and mounting in the seat 20 in the core 9, as may be desired for given service. When an orifice element 15 is to be applied to the valve the core 9 is rotated to bring the seat 20 into register with the side window 6 and the discoidal element 15 is then passed in through the window and mounted in the seat 20. When the element 15 has been so seated the window is closed and sealed by a relative cap 21 which is then suitably fastened, as by screws 22, Fig. 3.

Means are here provided whereby to effectively close off the inlet port 3 of the valve when this is in service in a flow line or conduit so as to enable the ready removal of the orifice element 15 from the core 9. Such means here includes a block or gate member 25 having a curved face 26 concentric to the surface of the shell chamber 4 and of a length and width to effectively cover the inlet port 3 when the gate 25 is in closing position thereover, Fig. 1. The gate has an inner face 27 lying toward the adjacent flat side of the core 9 and is constantly thrust in one direction, clockwise in this case, by means of upper and lower expansion springs 28—29 seating on core lugs 30 and gate shoulders 31, Fig. 2.

Figure 2:
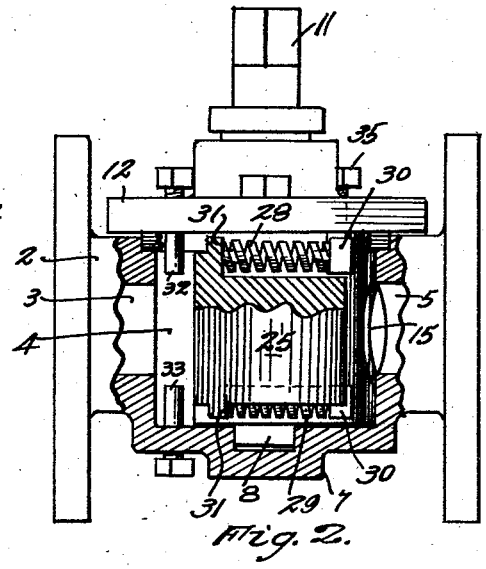
Figure 2 is a sectional side elevation showing the valve gate in open position.
Figure 4:
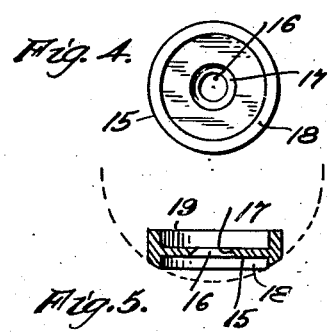
Figure 4 is an outside face view of the changeable orifice element.
Figure 5:
Figure 5 is an axial section of the orifice element.
Figure 3:
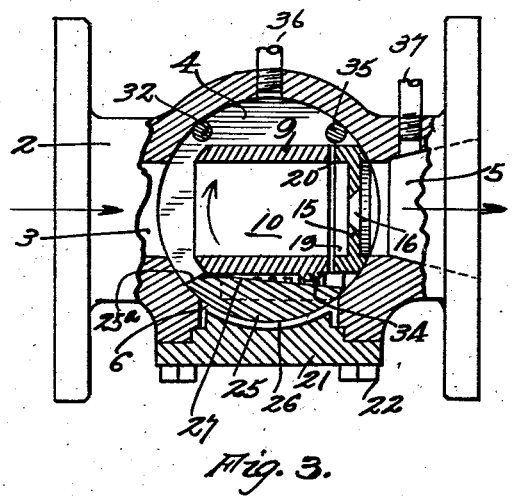
Figure 3 is a transverse-sectional plan of the valve in open position.

When the core 9 is turned from open position, Fig. 3, to close the gate 25 over port 3 the springs act to force the gate around to the port 3, Fig. 1, until the acutely beveled nose 25ª of the gate is stopped by a suitable abutment device, which is here shown in the form of alined, upper and lower screws 32—33 projecting into the closing path of the gate. The reaction of the nose and the stops 32—33 tends to thrust the gate 25 outward into tight sealing engagement with the bore surface at the inlet port 3. It will be seen that when so closed by the gate, it is possible to remove and replace one orifice element 15 by another without flow into the valve chamber.

The gate face 27 is slightly oblique as to the core 9 and when in closed position at port 3 the gate is rigidly jammed to its wall seat by engagement of a part of the core, such as a projection 34, with the adjacent face of the closed gate 25.

When the valve is to be opened the core is turned contraclockwise, with slight initial lost motion, and will then engage the adjacent nose end of the gate 25 and push this to the open position shown in Fig. 3. A stop device or screw 35 limits the opening turn of the valve core 9. When the gate 25 has been turned to closing position the core 9 has shifted the removable orifice disc or element 15 to correct registering relation as to the closed window 6, and change is easily made.

The shell 2 has a fluid conduit 36 from its bore, and a like connection 37 from the outlet port 5 to suitable metering or differential pressure indicators, not here shown.

It will be seen that fluid pressure on the outer face of the closed gate has an opening reaction which assists in the opening operation of the core.

When the beveled nose 25ª engages the stops 32—33 there is an out-thrust reaction tending to close the gate 25 to its seat, and further seating pressure is derived from the pressure of the part 34 of the core engaging the closed gate and jamming it to the wall of the bore.

What is claimed is:

1. A changeable orifice valve having a shell provided with a window, and a closure operating core turnably mounted in the shell and having a freely telescopic, removable orifice element directly bearing on the bore of the shell and turnable by the core to register with the window for ready removal of the element; said element consisting of an orificed discal body confined to radial sliding action only in the core.

2. A changeable orifice valve having a shell having a window and a removable cap therefor, a removable orifice element consisting of a ring slidably mounted on the bore of the shell, and a valve core in which the element is telescopic and said core operative to shift the said element into register with the window for removal therethrough; said core having an annular seat confining said ring element to radial reciprocation as to the core.

3. A changeable orifice valve having a shell with flow ports, means to close one of the ports and including a core turnably mounted in the shell, said shell having a window, and an annular orifice element operatively seating in the shell bore and being movably and telescopically mounted in and shiftable by the core from a flow position to registration with the window for removal therethrough, said element being confined in the core against lateral lost motion, and means to engage and stop the core when the orifice element is in axial alinement with a relative shell port and said element being seated in the shell by fluid pressure therein.

4. A valve as set forth in claim 3, and having a closure device turnable by the valve core to closed position when the said element is in register with the window.

5. A valve including a shell with inlet and outlet ports and a cap-closed window, a closure gate in the shell, a fluid-pressure actuated removable orifice element turnably seated in the shell bore, and means for concurrently moving the gate to a closing position and the said element into register with the window for removal therethrough and in which the element is telescopically fitted for radial movement without lateral lost motion to facilitate axial alinement with the outlet port.

6. A valve as set forth in claim 5, and including means for positively jamming the gate to a seat part in the shell when the gate is in closing position and yieldable means urging the gate in direction of its closing rotation.

7. A valve including a shell, a gate slidably seated internally on the wall of the shell, a core turnably mounted in the shell and free of contact with the shell wall, and an expansion connection between the core and the gate and reacting in the closing direction of rotation of and on the gate and whereby the gate is turned to closed position as the core is correspondingly actuated, and stop means to engage the closing gate, said expansion connection operating to thrust the gate's leading end against a frontal corner of the core while in the open position and said gate initially engaging said stop and the core having subsequent turning movement as to the arrested gate and being operative to set it in port closing position.

8. A changeable orifice valve including a shell having a window, means for shutting off flow through the shell, and a fluid-pressure set orifice element mounted slidably on the bore of the shell and shiftable by said means from an effective flow position to a position at the window so as to be removed therethrough without removal of the shut off means or parts thereof and while said means is in shut-off position, said means including a core rotative into position to aline a flow duct therein with a discharge port in the shell, means to stop the core in the port alined discharge position, and said element mounted in said core for radial movement only on the axis of the core duct and for co-axial register with the shell port.

9. In a valve, a closure gate, and a stop therefor; said valve gate having an acute nose to present a wedging bevel face to the stop and whereby the gate is thrust outward toward its seat in the valve, said stop presenting an angular face under which the acute nose of the close gate interlocks against radial slip.

10. A changeable orifice valve having a ported shell provided with a cap closed window and having a cylindrical bore, a closure operating core turning in and free of the bore and having a diametrical duct and an exterior, annular seat in said core at the end of and co-axial with said duct; and an annular orifice disc movably mounted in said seat for radial movement only toward a ported part of said bore face and the outer face of said disc being conformed to the bore surface.

11. A valve of the class described having a shell with a discharge port, a core turnable in the shell free of wall contact and having a flat side, a stop in the bore of the shell, and a port closure member interposed between said flat core side and the shell wall and providing for relative rotation of the core, and means on the core yieldingly pressing said member forward to engage the stop, and means on the core to positively seal said member on a seat around said port subsequent to arrest of the member by the stop; said stop and the nose of said member having meeting faces mutually reacting to radially thrust the member to its bore seat at the port.

12. In a valve of the class described, a ported shell provided with a core having at one side a port closing member, a spring device supported on said side of the core and operative to thrust said member across said side into a position in which it is abutted by the core when the parts are in port opening position, and a stop in the bore of the shell to stop said member in port closing position and providing for subsequent rotation of the core and compression of the spring device.

13. A valve as in claim 12, and said device consisting of balancing springs disposed at said side of the core and at the top and bottom of said member.

JESSE C. WYNKOOP.